United States Patent [19]

Ohmura et al.

[11] E Patent Number: Re. 32,959

[45] Reissued Date of Patent: Jun. 20, 1989

[54] AUTOMATIC FOCUSING APPARATUS

[75] Inventors: Hiroshi Ohmura; Takashi Maemori; Toshio Ishii, all of Tokyo, Japan

[73] Assignee: Fuji Photo Film Co., Ltd., Kanagawa, Japan

[21] Appl. No.: 893,685

[22] Filed: Aug. 6, 1986

Related U.S. Patent Documents

Reissue of:

[64] Patent No.: 4,582,411
Issued: Apr. 15, 1986
Appl. No.: 736,318
Filed: May 21, 1985

[30] Foreign Application Priority Data

May 21, 1984 [JP] Japan ..... 59-100419

[51] Int. Cl.[4] ..... G03B 3/00
[52] U.S. Cl. ..... 354/403
[58] Field of Search ..... 354/400–409, 354/195.1, 195.12

[56] References Cited

U.S. PATENT DOCUMENTS

| | | | |
|---|---|---|---|
| 4,119,983 | 10/1978 | Tanaka | 354/195.12 |
| 4,123,765 | 10/1978 | Isono | 354/405 |
| 4,204,760 | 5/1980 | Kobayashi | 354/195.12 |
| 4,367,934 | 1/1983 | Matsui | 354/403 |
| 4,459,004 | 7/1984 | Morizumi | 354/403 |
| 4,490,031 | 12/1984 | Mineshima | 354/402 |
| 4,505,566 | 3/1985 | Noguchi | 354/400 |
| 4,643,554 | 2/1987 | Ogawa | 354/400 |

*Primary Examiner*—W. B. Perkey
*Attorney, Agent, or Firm*—Young & Thompson

[57] ABSTRACT

An automatic focusing apparatus for use with a camera of the type having two interchangeable lenses with different focal lengths, includes a ranging device for finding in which distance range is located an object to be photographed, i.e., close range or long range. The ranging device is capable of shifting the position of the boundary between short range and long range when interchanging lenses in order to widen the limits of the range in which either of the lenses can be focused better.

14 Claims, 7 Drawing Sheets

AUTOMATIC FOCUSING APPARATUS

Matter enclosed in heavy brackets [ ] appears in the original patent but forms no part of this reissue specification; matter printed in italics indicates the additions made by reissue.

BACKGROUND OF THE INVENTION

The present invention relates to an automatic focusing apparatus used for optical instruments which are of variable focal length, such as a camera having interchangeable lenses.

There is known in the art a camera of the type having interchangeable lenses, namely, a wide angle lens and a telephoto lens arranged side by side. Such a camera allows photographers the flexibility of choosing a lens suitable for the object to be photographed.

On the other hand, there have been provided many types of automatic focusing apparatus, one being of the type having a lens which is automatically axially displaced in order to assume either of two fixed positions (which are referred to as lens positions) in accordance with the subject distance which is generally divided into two distance ranges, namely, a close range and a long range. Such a two-range automatic focusing apparatus, which facilitates ranging and lens adjusting, makes it easy to reduce the production cost of the camera. In this case where the above-mentioned two-range automatic focusing apparatus is incorporated into a camera of the type mentioned above, the distance ranges will be established in common to both lenses regardless of the focal lengths thereof. Therefore, when establishing the distance ranges and the lens positions so as to widen the limits within which one lens can be well focused, the limits within which the other can be well focused are unavoidably reduced. For example, when widening the limits in which a telephoto lens can be well focused, a wide angle lens which can be chosen in place of the telephoto lens exhibits worsened focusing conditions for close distances compared to the case in which there are provided the distance ranges and the lens positions peculiar to the telephone lens. Therefore, it becomes impossible to improve focusing conditions substantially, over a broad distance range.

OBJECTS OF THE INVENTION

It is therefore an object of the present invention to provide an improved apparatus for automatically focusing over a broad distance range even when choosing either of the interchangeable lenses having different focal lengths.

It is another object of the present invention to provide an improved apparatus for automatically focusing which is capable of shifting the position of the boundary by which the object distance is divided into two distance ranges.

SUMMARY OF THE INVENTION

For accomplishing the objects mentioned above, the present invention provides a ranging device which is capable of shifting the position of the boundary by which the object distance is divided into two distance ranges, namely, a close range and a long range, upon choosing either of two lenses having different focal lengths. Just after the position of the boundary is shifted, the chosen lens is displaced to one of the particular lens positions in order to be focused on an object to be photographed. The displacement of the lens is effected responsive to the detection of the distance range in which the object is located.

By virtue of the automatic focusing apparatus being as described above, and because the position of the boundary dividing the object distance into two distance ranges can be established suitably for each lens, a broad distance range in which an object is in focus can be realized regardless of the focal length of the lens used.

BRIEF DESCRIPTION OF THE INVENTION

These and other features and advantages of the present invention will be described i more detail in the following, by way of example, reference being made to the accompanying drawings, in which.

DETAILED DESCRIPTION OF THE INVENTION

Figure 1:
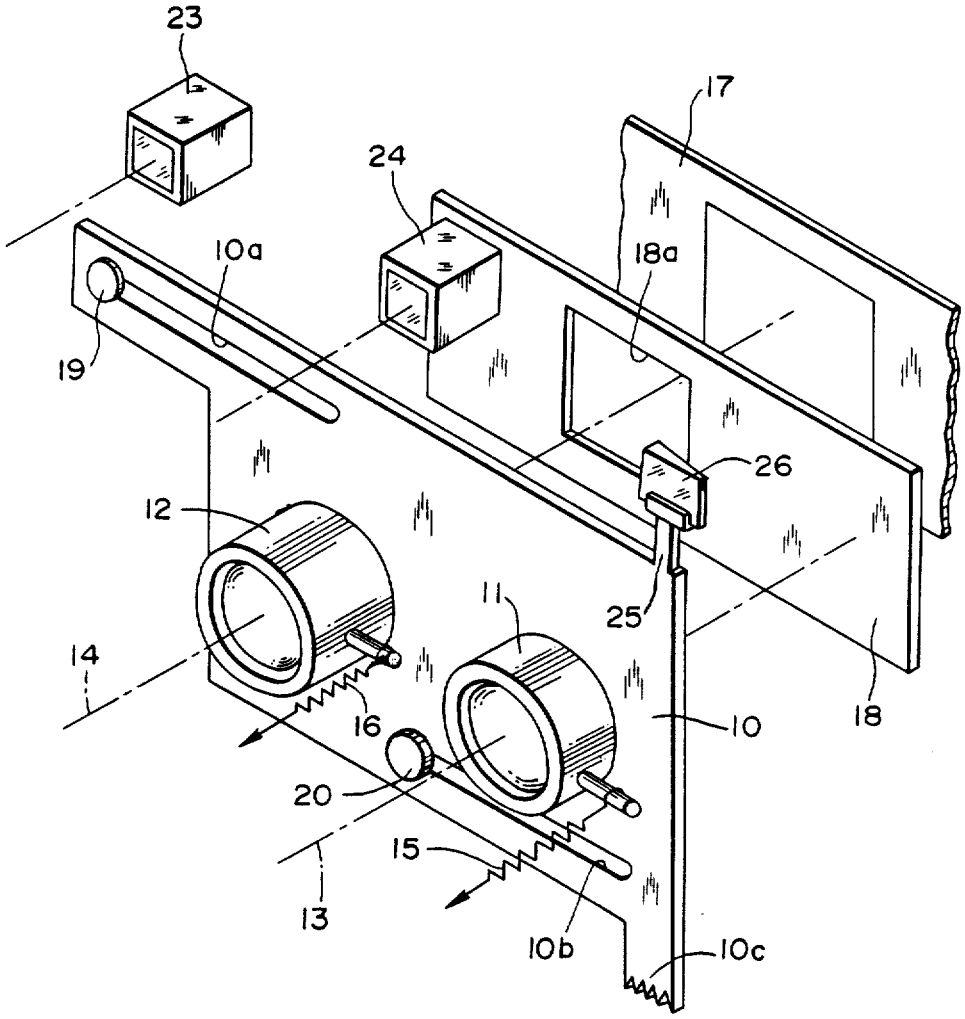
FIG. 1 is an exploded perspective view showing an embodiment of the present invention in which a triangular prism is removably positioned and a telephoto lens is chosen.
Figure 2:
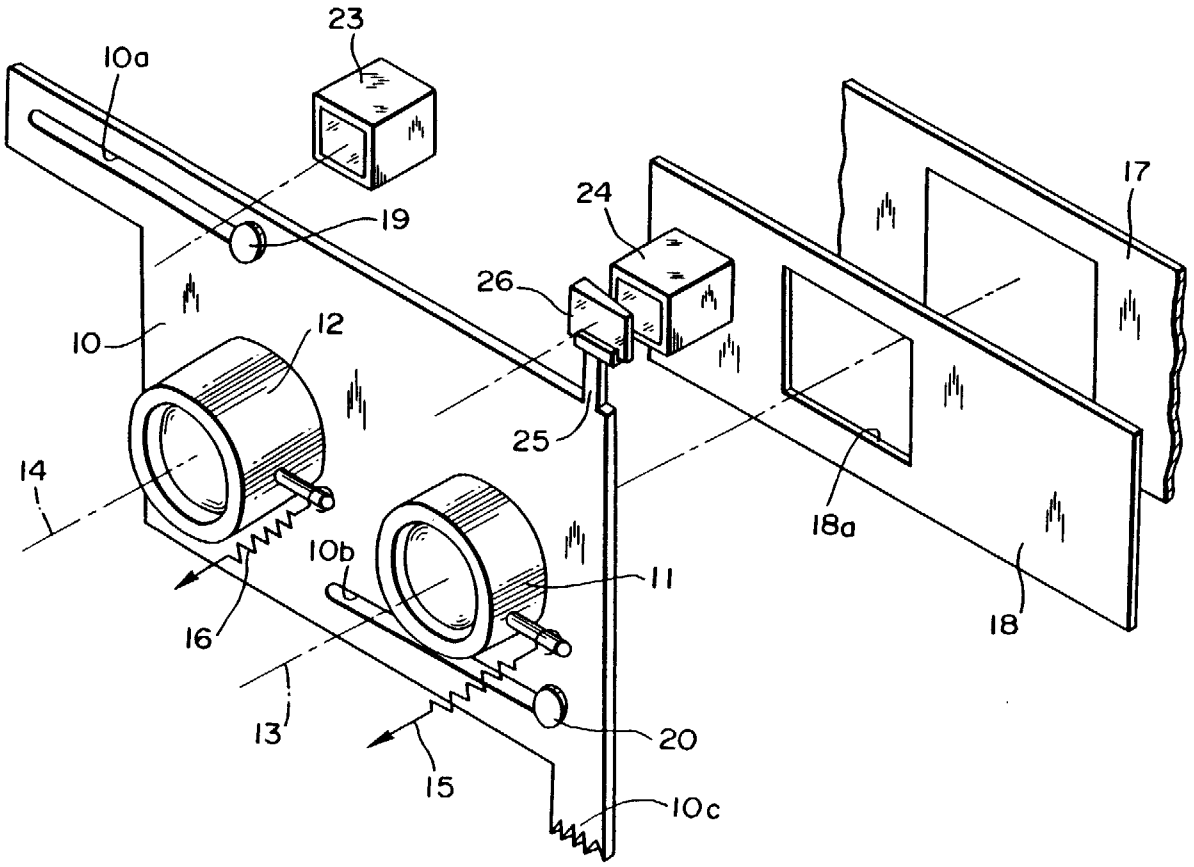
FIG. 2 is an exploded perspective view similar to FIG. 1 but with the triangular prism removed and a wide angle lens chosen.

Referring now to FIGS. 1 and 2, there is shown therein an automatic focusing apparatus of the present invention applied to a camera with twin lenses selectively used. Mounted side by side on a lens board 10 are a wide angle lens 11 and a telephoto lens 12 both of which are biased by springs 15, 16 for axial displacement, usually in a direction away from a film 17. Behind the lens board 10 there is disposed a mask plate 18 formed with an exposure window or aperture 18a in order to permit light rays to fall on the film 17. The lens board 10, which has guide slots 10a, 10b engaged with fixedly mounted pins 19, 20 respectively, can be manually moved for lateral displacement by pushing it through a projection 10c in a direction perpendicular to the optical axes 13, 14. In FIG. 1, the lens board 10 has been moved to the right in order to select the telephoto lens 12.

As is well known in the art, a ranging device has as its main component a light projector 23 for producing a beam of near-infrared light which is projected onto an object to be photographed and a photodetector 24 which receives the light beam reflected from the object and provides an output signal for signal evaluation in order to determine whether the object is at close range or long range. According to the distance range thus determined, the lens now chosen is displaced to one of its particular lens positions. The object distance is divided into two ranges on opposite sides of an established boundary, namely, close range and long range.

It should be noted that in the present invention, the position of this boundary is shiftable between two particular positions responsive to the choice of lens.

For shifting the position of the boundary, there is mounted on the lens board 10 a triangular prism 26 supported by a holder 25 so as to be moved together with the lens board 10 when changing lenses. As shown in FIG. 2, when the lens board 10 is moved from the position shown in FIG. 1 for using the wide angle lens 11, the triangular prism 26 is placed in alignment with the photodetector 24.

Figure 3:
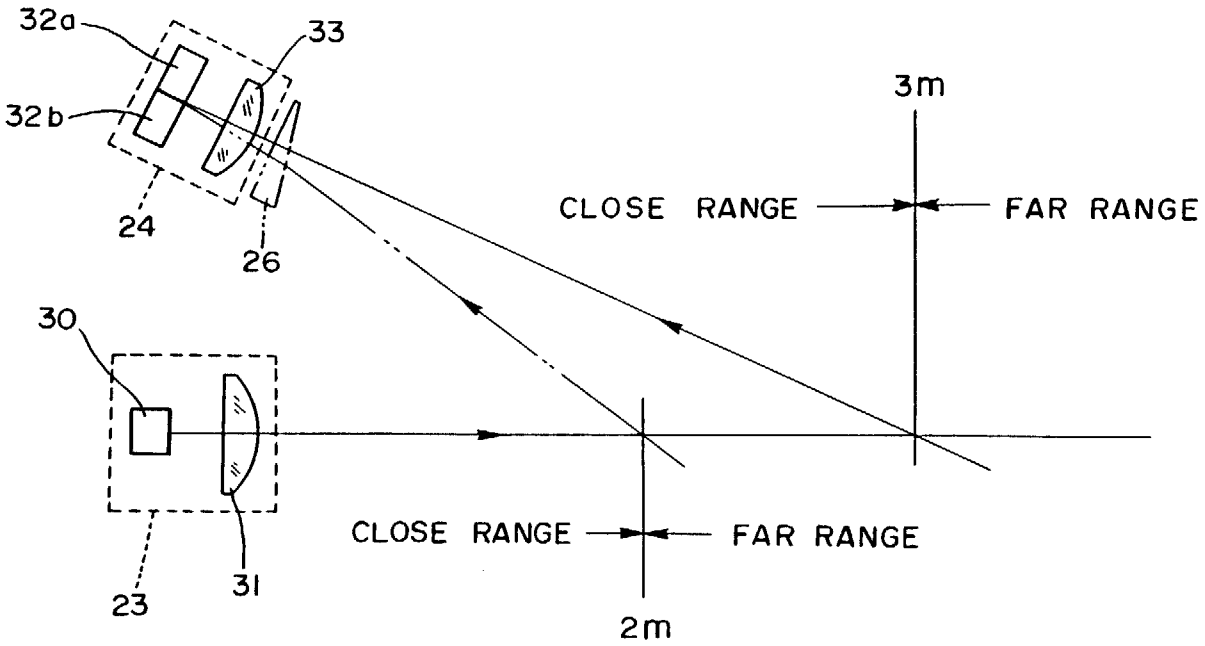
FIG. 3 is a diagram showing a ranging device which is adapted for shifting the position of the boundary by which the object distance is divided into two distance ranges.

As can be seen from FIG. 3 illustrating how to shift the position of the boundary, the light projector 23 comprises a light emitting diode 30 for producing a near-infrared light and a condenser lens 31 for condensing the light into a beam so as to project it toward the object to be measured for distance. The light reflected from the object to be measured for distance is focused on an image-forming surface of a lens 33 disposed side by side with and at a predetermined distance from the lens 31. On the image-forming surface of the lens 31, there are arranged two photodetector elements 32a, 32b for receiving the spot beam reflected from the object. The lens 33 of the photodetector 24 is oriented as to look fixedly at the boundary which is established at a distance of, for exmaple 3, three meters from the focal plane when the telephoto lens 12 is used. Therefore, if the object to be measured for distance is at close range, that is to say, on the camera side of the boundary, the reflected beam from the object falls on the photodetector element 332a and the resultant output produced by the photodetector element 32a becomes greater than that of the other photodetector element 32b. On the other hand, if the object is at long range, the reflected beam falls on the photodetector element 32b and the element 32b produces an output greater than the output of the other element 32a.

As previously explained in detail, the other position of boundary peculiar to the wide angle lens 11 is established at a distance of, for example, two meters by placing the triangular prism in alignment with the photodetector 24. The distance range in which the object stands is found by comparing one output with the other in the same manner as described for the case in which the telephoto lens is used.

Although the ranging device in the above-mentioned embodiment has been described as an active type or light beam projection type, the invention is applicable to a passive type of ranging device in which two photodetector are arranged side by side in order to compare the respective images formed thereon with each other for finding in which one of the distance ranges the object to be photographed is located. In this case, one detector is so disposed in position as to have its optical axis substantially parallel to the optical axis of both of the wide angle and telephoto lenses and the other is oriented so as to look fixedly at either of the two distance ranges, for example the close range. When the images formed on the respective photodetectors are coincident with each other, the object is thus indicated to be in the close range. On the other hand, if non-coincidence of the images takes place, the object is found to be at long range. In addition, instead of using the triangular prism 26, the photodetector 24 may be rotated about the focal point of the lens 33 for angular displacement upon interchanging lenses in order to shift the position of the boundary.

Figure 4:
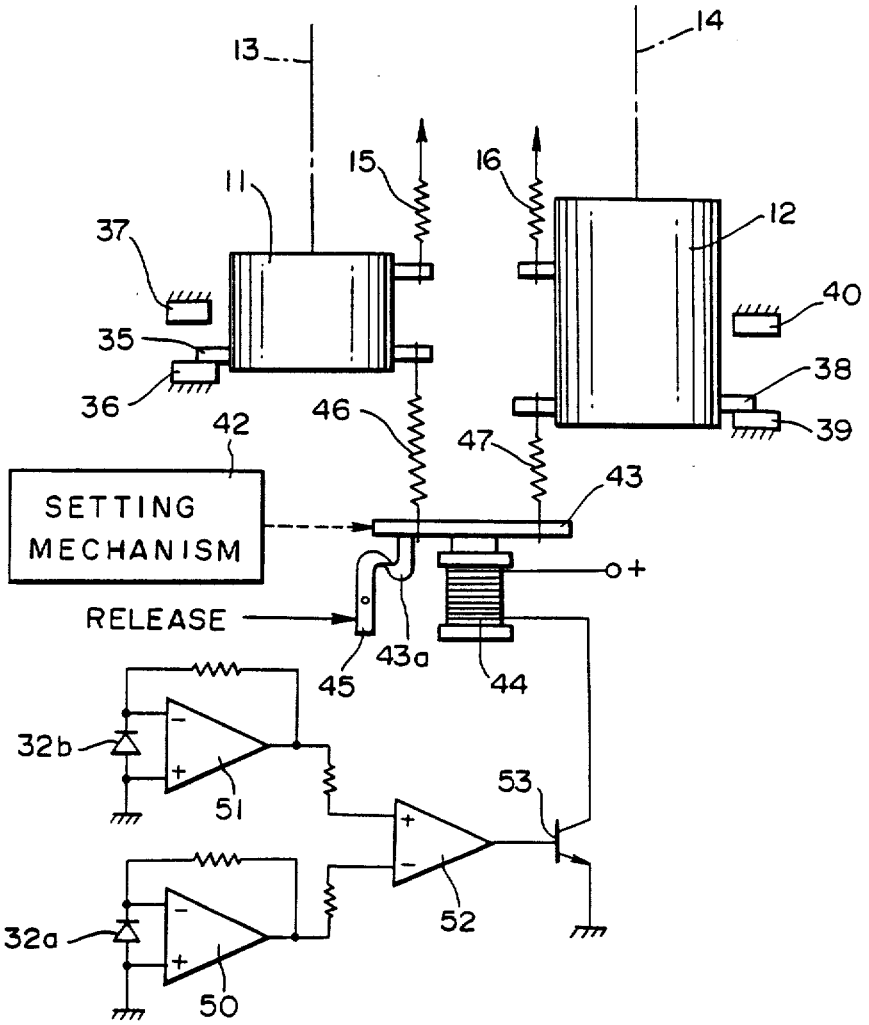
FIG. 4 is a schematic diagram showing a mechanism for displacing lenses to particular lens positions.

Referring to FIG. 4 showing a device for moving the lenses to their particular positions, the wide angle lens 11 is provided with a pin 35 which is engageable with a positioning detent 36 when the subject is at long range and with a positioning detent 37 when the subject is at close range. Thus, the wide angle lens 11 is adjusted to either of the two particular positions, namely, the long range position and the close range position. Similarly, the telephoto lens 12 is adjusted to either of its long range and close range positions by the engagement of a pin provided thereon with one of the positioning detents 39, 40. The positions are established at different distances according to the type of lens. For example in this embodiment, the wide angle lens 11 has the long range position 1.2 meters distant therefrom and the close range position three meters distant therefrom; and the telephoto lens 12 has the long range position 1.8 meters distant and the close range position four meters distant.

Setting mechanism 42 for adjusting these lenses 11, 12 to their respective particular positions is operated in cooperation with a film winding mechanism which is not shown in the drawing. As a result of the winding-up operation of the film winding mechanism, the setting mechanism brings an armature 43 into contact with an electromagnet 44, while a hook 43a on the armature 43 is engaged with a hook lever 45 so as to keep the wide angle lens 11 and the telephoto lens 12 at the respective long range positions. The lock lever 45 is actuated as a result of the release operation of a shutter button for pivotal movement in the counterclockwise direction in order to disengage the hook 43a. Because there are provided strongly biased springs 46, 47 between the armature 43 and the respective lenses 11, 12, the disengagement of the hook 43a from the lock lever 45 causes no movement of the lenses 11, 12 to the respective close-range positions when the electromagnet 44 is energized to attract the armature 43. All of the setting mechanism 42, the armature 43, the electromagnet 44 and the lock lever 45 are mounted on the lens board 10 and thus move together with it.

A comparator 52 compares the outputs from the photodetector elements 32a, 32b after being amplified by amplifiers 50, 51 and provides a high level output signal when the subject is at long range, and on the other hand, a low level output signal when the subject is at close range. The resultant high level output signal present at the output of the comparator 52 causes the transistor 53 to turn ON so as to energize the electromagnet 44.

When the low level output signal is present at the output of the comparator 52 and serves to turn the transistor 53 OFF, the electromagnet 44 is deenergized to release the armature 43. Under such circumstances, causing the lock lever 45 to rotate in the counterclockwise direction in cooperation with the pre-operation of a shutter release button (not shown), the hook 43a is disengaged for axial movement of the armature in order to permit the lenses 11, 12 to move forward by the biasing force of the springs 15, 16, respectively. As a result, both lense 11, 12 are placed at the respective close-range positions. When the ranging device finds the object to be at long range, the electromagnet 44, as described hereinbefore, keeps the armature 44 attracted even if the hook 43a is disengaged and both lenses 11, 12 are maintained at the respective long-range positions.

Figure 5:
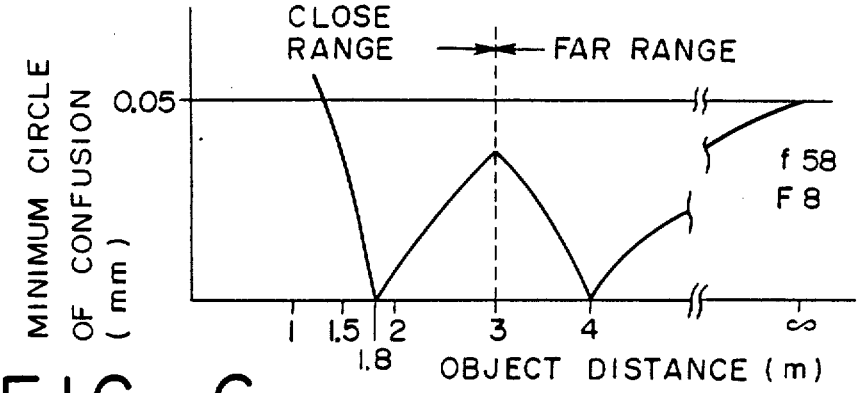
FIG. 5 is a graph showing the relationship between object distance and minimum circle of confusion when a telephoto lens is focused.

A telephoto lens 12 having, for example, a focal length f=58 mm and an aperture ratio F=8 is focused in accordance with the relationship shown in FIG. 5. As is apparent from FIG. 5, the telephoto lens 12, which is capable of occupying two positions at 1.8 meters distance and at four meters distance according to the detected distance range, is focused satisfactorily between about 1.5 meters distance and infinity.

Figure 6:
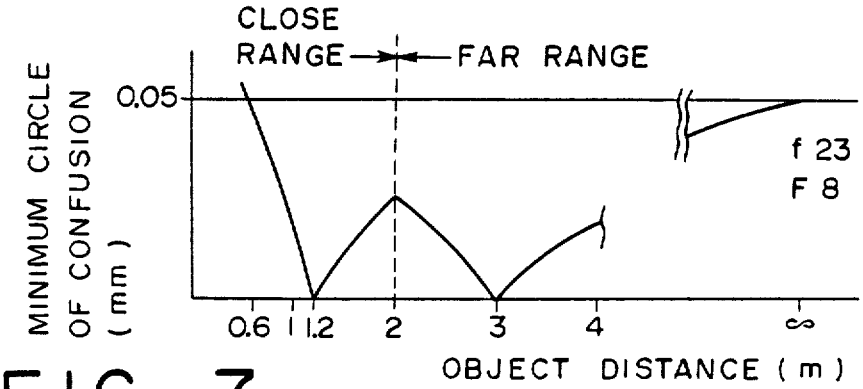
FIG. 6 is a graph showing the relationship between object distance and minimum circle of confusion when a wide angle lens is focused.

FIG. 6 shows the relationship when the wide angle lens 11 having, for example, a focal length f=23 mm and an aperture ratio F=8 is focused. As is apparent from FIG. 6, the wide angle lens 11, which is capable of occupying the two positions at 1.2 meters distance and at three meter distance, is focused satisfactorily between about 0.6 meter and infinity.

In each case, when using a lens of the type having a diaphragm which is variable in aperture corresponding to subject brightness, the lens will be focused more satisfactorily by being disposed at different positions in accordance with aperture sizes.

Figure 7:
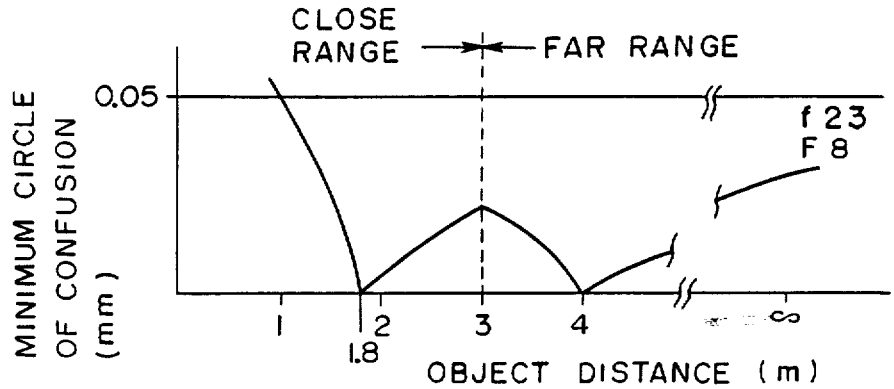
FIG. 7 is a graph showing the relationship between object distance and minimum circle of confusion in wide angle photography when using a conventional automatic focusing device.

FIG. 7 shows the relationship when the wide angle lens 11 of FIG. 6 is focused. However, in this case, the wide angle lens 11 has its long range and close range positions identical to those of FIG. 5 and the ranging device has its boundary established at three meters distance also as in FIG. 5. Under such circumstances, as is apparent from FIG. 7, the diameter of the minimum circle of confusion or the degree of blur becomes much larger on the short distance side and the shortest distance for acceptable focus is one meter.

Figure 8:
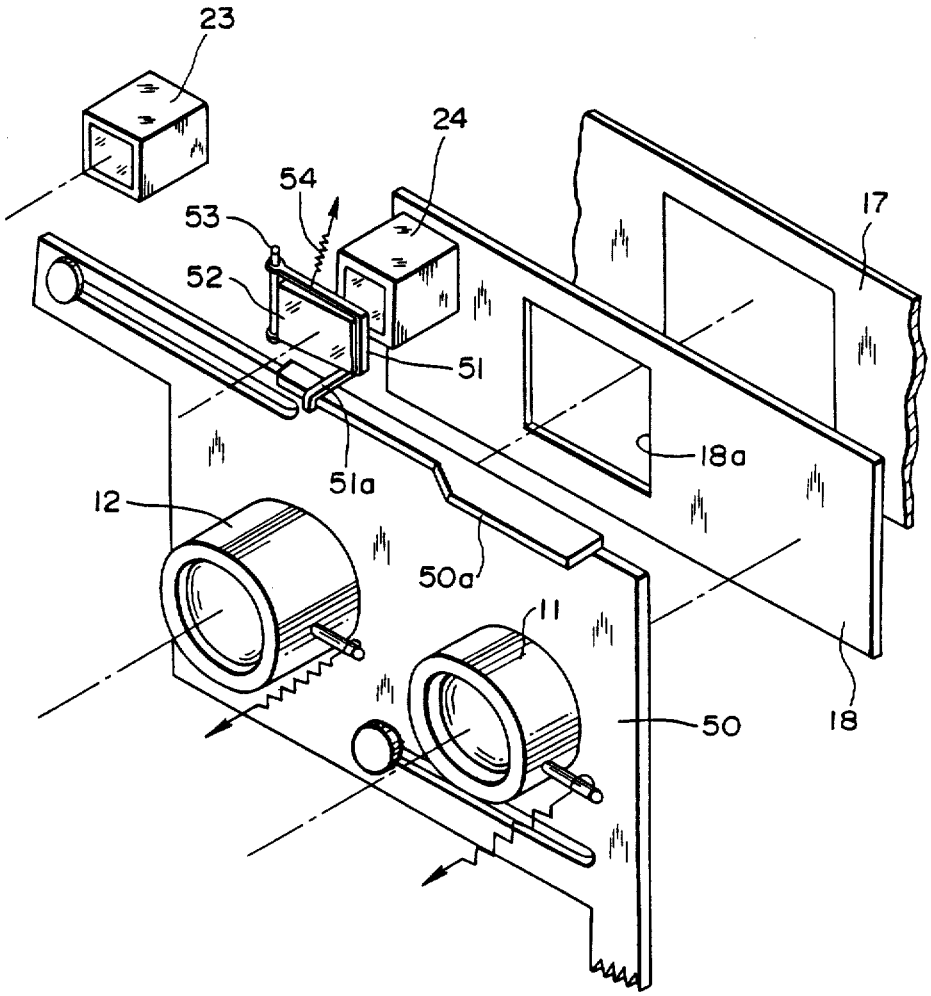
FIG. 8 is an exploded perspective view showing another embodiment of the present invention in which a triangular prism is pivotally mounted for the purpose of shifting the position of the boundary.

The automatic focusing apparatus can be modified as shown in FIG. 8, to which reference is now made. In this embodiment, the triangular prism is pivotally mounted for angular displacement in order to bend the incident beam to the photodetector. In FIG. 8, there is formed at the top of the lens board 50 a cam 50a with which a follower 51a of a holder 51 is in slidable contact. The holder 51, which supports a triangular prism 52 therein, is pivotally mounted on a shaft 53 for angular displacement and is biased by a spring 54 to move the lens board 50 so as to interchange the lenses 11, 12. The angular displacement of the holder is caused by the lateral movement of the cam 50a. Thus, the triangular prism 52 supported by the holder 51 is displaced between two positions so as to bend the incident beam to the photodetector 24 is order to shift the position of the boundary in the same manner as is shown in FIG. 3.

Figure 9:
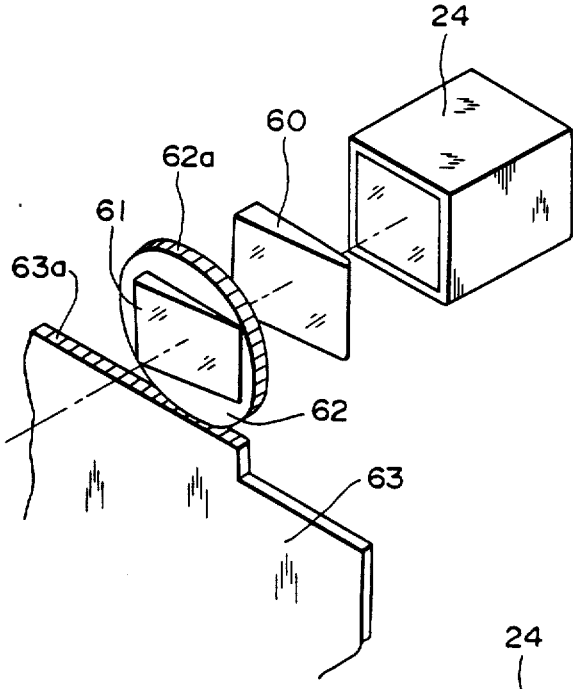
FIG. 9 is an exploded perspective view of still another embodiment of the present invention in which a fixed triangular prism and a rotatable prism are combined for the purpose of shifting the position of the boundary when a wide angle lens is chosen.
Figure 10:
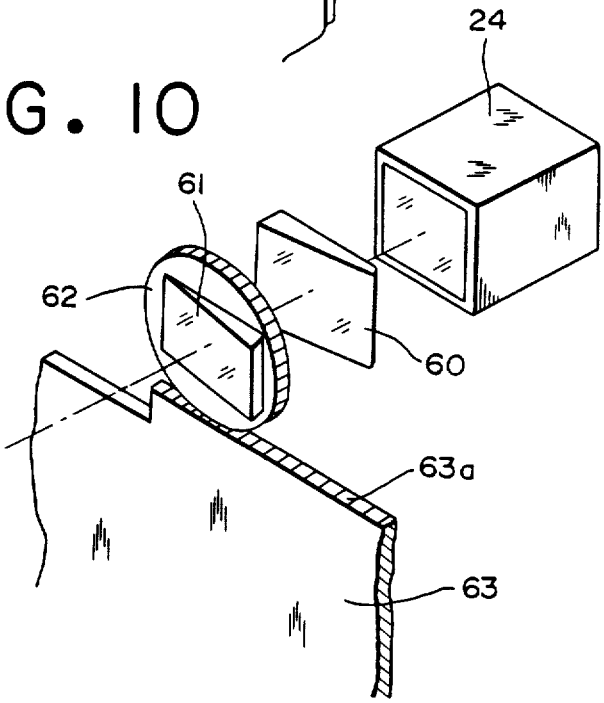
FIG. 10 is an exploded perspective view similar to FIG. 9 when a telephoto lens is chosen.

FIGS. 9 and 10 show another embodiment of the present invention in which a fixed and a rotatable triangular prism are used for shifting the position of the boundary between two positions. In front of the photodetector 24, there are provided a fixed triangular prism 60 and a triangular prism 61 in alignment with each other. The triangular prism 61 is supported by a rotatable ring 62 which, on its periphery, is provided with a pinion gear 62a engageable with a rack 63a provided at the top of a lens board 63. As is shown in FIG. 9, when choosing the wide angle lens 11, the both triangular prisms 60, 61, and more specifically the respective apices thereof, are oriented in the same direction to bend the incident beam to the photodetector 24. On the other hand, as is shown in FIG. 10, when choosing the telephoto lens 12, the ring 61a is turned through 180° to orient the triangular prism 61 supported thereby in a direction opposite to that of the fixed prism 60. As a result, the triangular prisms 60, 61 function substantially as a flat plate of glass as a whole so as not to bend the incident beam to the photodetector 24, thereby shifting the position of the boundary to the long range position.

Although the present invention has been described in connection with a camera of the type having a wide angle lens and a telephoto lens interchangeably arranged side by side, it is equally applicable to cameras having a varifocal lens such as a zoom lens which is displaced between two particular lens positions or having a standard lens on which a conversion lens is detachably mounted in order to vary its focal length. The combination of a telephoto lens and a wide angle lens, which is given by way of example in order to show the relation therebetween, may be replaced by combinations of a wide angle and a standard lens, combinations of a standard lens and a telephoto lens, or other such combination of lenses.

What is claimed is:

1. An automatic focusing apparatus for a camera having objective means including two different alternatively usable objective lenses, comprising means for selectively positioning either of said lenses to project an image of an object to be photographed onto a photographic film;

means common to both lenses for determining on which side of a boundary between short range and long range is located an object to be photographed;

means responsive to said determining means for varying the focus of said objective means in at least two steps; and means responsive to said positioning means for varying the position of said boundary according to which of said objective lenses is in use.

2. An apparatus as defined in claim 1, in which said objective means comprises a lens board, said objective lenses comprise a wide angle lens and a telephoto lens which are movably mounted side by side on said lens board for conjoint axial displacement, and means mounting said lens board for sliding movement transverse to the direction of said axial displacement to place either of said wide angle and said telephoto lens in alignment with an exposure aperture of a said camera.

3. An apparatus as defined in claim 2, in which said determining means comprises range finding means including a projector producing a beam of radiation which is projected onto an object to be photographed and a photodetector having two photosensitive elements which receive the beam reflected from said object, one of said elements detecting close range and the other element detecting long range.

4. An apparatus as defined in claim 3, wherein said boundary varying means includes a triangular prism fixed to said lens board, said triangular prism being removably disposed in front of said photodetector when said lens board is slidably moved to place said wide angle lens in alignment with said exposure aperture.

5. An apparatus as defined in claim 3, wherein said boundary varying means includes a triangular prism disposed in front of said photodetector, said triangular prism being moved for angular displacement responsive to said slidable movement of said lens board.

6. An apparatus as defined in claim 3, wherein said boundary varying means includes a fixed first triangular prism and a second triangular prism, said second triangular prism being rotatable upon said slidable movement of said lens board.

7. An apparatus as defined in claim 6, in which said second triangular prism is held in a ring which, on its periphery, is provided with a pinion gear engageable with a rack provided on said lens board so as to rotate said second triangular prism.

*8. An automatic focusing apparatus comprising;*

*means for finding that in which distance range an object to be photographed stands between a close range and a far range into which object distance is divided in front and in rear of a boundary;*

*means for varying the focal length of said objective means in at least two steps;*

*means for shifting the position of said boundary in cooperation with the operation of said focal length varying means; and*

*means for displacing said objective means to particular positions in accordance with said distance range found.*

*9. An apparatus as defined in claim 8, in which said objective means comprises a lens board, a wide angle lens and a telephoto lens which are movably mounted side by side on said lens board for axial displacement, and the focal length of said objective means is varied by slidably moving said lens board to place either of said wide angle lens and said telephoto lens in alignment with an exposure aperture.*

*10. An apparatus as defined in claim 9, in which said range finding means comprises a projector producing light having a beam configuration which is projected onto an object and a photodetector having two photosensitive elements which receive the light beam reflected from said object.*

*11. An apparatus as defined in claim 10, wherein said means for shifting the position of said boundary includes a triangle prism fixed to said lens board, said triangle prism being removably placed in front of said photodetector when said lens board is slidably moved to place said wide angle lens in alignment with said exposure aperture.*

*12. An apparatus as defined in claim 10, wherein said means for shifting the portion of said boundary includes a triangle prism disposed in front of said photodetector, said triangle prism being moved for angular displacement in cooperation with said slidable movement of said lens board.*

*13. An apparatus as defined in claim 10, wherein said means for shifting the position of said boundary includes a first triangle prism fixedly provided and a second triangle prism, said second triangle prism being rotated in cooperation with said slidable movement of said lens board.*

*14. An apparatus as defined in claim 13, in which said second triangle prism is held in a ring which, on its periphery, is provided with a pinion gear engageable with a rack provided on said lens board.*

* * * * *